United States Patent
Lee et al.

(10) Patent No.: US 9,316,877 B2
(45) Date of Patent: Apr. 19, 2016

(54) DISPLAY APPARATUS, DISPLAY SYSTEM HAVING THE SAME AND METHOD OF MANUFACTURING THE DISPLAY APPARATUS

(75) Inventors: Dae-Young Lee, Suwon-si (KR); Gug-Rae Jo, Asan-si (KR); Jae-Hyuk Chang, Seongnam-si (KR); Youn-Gu Lee, Suwon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 256 days.

(21) Appl. No.: 13/605,585

(22) Filed: Sep. 6, 2012

(65) Prior Publication Data
US 2013/0088669 A1    Apr. 11, 2013

(30) Foreign Application Priority Data

Oct. 11, 2011  (KR) .................. 10-2011-0103505

(51) Int. Cl.
| G02F 1/1335 | (2006.01) |
| G02F 1/1347 | (2006.01) |
| G02B 27/22 | (2006.01) |
| G02F 1/13363 | (2006.01) |
| H04N 13/04 | (2006.01) |

(52) U.S. Cl.
CPC .............. *G02F 1/1347* (2013.01); *G02B 27/22* (2013.01); *G02B 27/2214* (2013.01); *G02F 2001/133541* (2013.01); *G02F 2001/133638* (2013.01); *H04N 13/0438* (2013.01)

(58) Field of Classification Search
CPC .. G02B 27/2214; G02B 27/22; G02F 1/1347; G02F 2001/133638; G02F 2001/133541; H04N 13/0438

USPC ....................................................... 349/15, 18
See application file for complete search history.

(56) References Cited

U.S. PATENT DOCUMENTS

2009/0109380 A1*  4/2009  Kamee ........................... 349/96
2012/0154698 A1*  6/2012  Matsuhiro et al. .............. 349/15

FOREIGN PATENT DOCUMENTS

| JP | 2011-075817 | 4/2011 |
| KR | 10-0893924 | 4/2009 |
| KR | 10-2010-0005265 | 1/2010 |

OTHER PUBLICATIONS

KR100893924 translation.*

(Continued)

*Primary Examiner* — Richard Kim
*Assistant Examiner* — Kendrick Hsu
(74) *Attorney, Agent, or Firm* — F. Chau & Associates, LLC (57) ABSTRACT

A display apparatus includes first, second and third substrates, first and second liquid crystal layers, first and second polarizing elements and a phase retarding element. The first substrate includes a first electrode part. The first liquid crystal layer is disposed on the first substrate. The second substrate is disposed on the first liquid crystal layer and includes a color filter and a second electrode part on a first surface and a third electrode part on a second surface. The second liquid crystal layer is disposed on the second substrate. The third substrate is disposed on the second liquid crystal layer and includes a fourth electrode part on a first surface. The first polarizing element is disposed under the first liquid crystal layer. The second polarizing element is disposed over the first liquid crystal layer. The phase retarding element is disposed over the second liquid crystal layer.

8 Claims, 8 Drawing Sheets

(56) References Cited

OTHER PUBLICATIONS

English Abstract for Publication No. 10-0893924 Publication Date: Jun. 10, 2008.

English Abstract for Publication No. 10-2010-0005265 Publication Date: Jan. 15, 2010.

English Abstract for Publication No. 2011-075817 Publication Date Apr. 14, 2011.

\* cited by examiner

DISPLAY APPARATUS, DISPLAY SYSTEM HAVING THE SAME AND METHOD OF MANUFACTURING THE DISPLAY APPARATUS

CROSS-REFERENCE TO RELATED APPLICATION

This application claims priority to Korean Patent Application No. 10-2011-0103505, filed on Oct. 11, 2011, the contents of which are incorporated by reference herein in their entireties.

TECHNICAL FIELD

Exemplary embodiments of the present invention relate to a display apparatus, and more particularly, to a display apparatus, a display system having the display apparatus, and a method of manufacturing the display apparatus

DISCUSSION OF THE RELATED ART

Liquid crystal display devices have typically only been capable of displaying two-dimensional (2D) images. Recently, liquid crystal display devices have been developed to display three-dimensional (3D) images. Such display devices may be known as stereoscopic image displays.

Generally, a stereoscopic image display displays the 3D image by relying upon a phenomenon known as binocular parallax. Binocular parallax permits people to experience depth perception by relying upon slight differences between the angle by which the left eye and the right eye observe a given subject. By providing a way for the display device to communicate distinct images to a viewer's left and right eyes, a viewer may recognize the stereoscopic image through the stereoscopic image display apparatus.

Auto-stereoscopic displays do not require the use of 3D glasses. However, other forms of stereoscopic image display apparatus may require the use of 3D glasses to help deliver the correct left eye and right eye images to the respective eyes of the viewer. Examples of stereoscopic display devices that use 3D glasses may include an anaglyph type, a shutter glasses type, and a polarizing glasses type. In the anaglyph type, a viewer typically wears blue glasses and red glasses to recognize the 3D image. In the shutter glasses type, a left eye image and a right eye image may be alternatively and temporally displayed, and a viewer wears glasses which opens and closes a left eye shutter and a right eye shutter in synchronization with the period of the display of the left and right images. In the polarizing glasses type, a viewer wears polarizing glasses having different polarizing characteristics according to left and right eyes. The polarizing glasses type display apparatus may then display the left and right eye images with differing polarizations.

There are two methods for displaying left and right eye images with different polarizations. The first approach is the patterned retarder type display. Here, spatial division is used to display left and right eye images and the patterned retarder polarizes the left eye display space a first way and polarizes the right eye display space a second way. The second approach is the active retarder type display. Here, temporal division is used to display the left and right eye images and the active retarder alternates between polarizing the display a first way and polarizing the display a second way.

The active retarder type display apparatus includes a display panel displaying an image and an active switch panel converting a polarizing characteristic of the image on the display panel to generate a left image and a right image.

Generally, in the active retarder type display apparatus, the display panel includes two glass substrates and the active switch panel includes two glass substrates so that a manufacturing cost of the display apparatus is increased, and a weight and a thickness of the display apparatus are also increased.

A process bonding the display panel and the active switch panel is required so that a manufacturing cost of the display apparatus is increased and a display quality of the display apparatus may be decreased due to a stain generated in the bonding process.

SUMMARY

Exemplary embodiments of the present invention provide a display apparatus with a relatively low manufacturing cost, a relatively light weight and a relatively small thickness. The display apparatus has a relatively high display quality.

Exemplary embodiments of the present invention provide a display system including the display apparatus.

Exemplary embodiments of the present invention provide a method of manufacturing the display apparatus.

According to an exemplary embodiment of the present invention, a display apparatus includes a first substrate, a first liquid crystal layer, a second substrate, a second liquid crystal layer, a third substrate, a first polarizing element, a second polarizing element and a phase retarding element. The first substrate includes a first electrode part. The first liquid crystal layer is disposed on the first substrate. The second substrate is disposed on the first liquid crystal layer. The second substrate includes a color filter and a second electrode part disposed on a first surface of the second substrate facing the first substrate. The second substrate also includes a third electrode part disposed on a second surface of the second substrate opposite to the first surface of the second substrate. The second liquid crystal layer is disposed on the second substrate. The third substrate is disposed on the second liquid crystal layer. The third substrate includes a fourth electrode part disposed on a first surface of the third substrate facing the second substrate. The first polarizing element is disposed under the first liquid crystal layer, with respect to a frame of reference in which the first substrate is considered to be under the third substrate. The second polarizing element is disposed over the first liquid crystal layer. The phase retarding element is disposed over the second liquid crystal layer.

According to an exemplary embodiment of the present invention, the first polarizing element may be disposed under the first substrate. The second polarizing element may be disposed between the second substrate and the second liquid crystal layer.

According to an exemplary embodiment of the present invention, the first polarizing element may be disposed between the first substrate and the first liquid crystal layer. The second polarizing element may be disposed between the first liquid crystal layer and the second substrate.

According to an exemplary embodiment of the present invention, the phase retarding element is a quarter-wave plate which creates a quarter wavelength phase shift in the light transmitted therethrough.

According to an exemplary embodiment of the present invention, the phase retarding element may be disposed on a second surface of the third substrate opposite to the first surface of the third substrate.

According to an exemplary embodiment of the present invention, the phase retarding element may be integrally formed with the third substrate and the combined phase retarding element and third substrate may be a rigid body. The phase retarding dement may be patterned on a second surface of the third substrate opposite to the first surface of the third substrate.

According to an exemplary embodiment of the present invention, each of the first substrate, the second substrate and the third substrate may include glass.

According to an exemplary embodiment of the present invention, each of the first substrate and the second substrate may include glass. The third substrate may include plastic.

According to an exemplary embodiment of the present invention, the first electrode part may include a plurality of pixel electrodes disposed in a matrix form. The second electrode part may include a common electrode.

According to an exemplary embodiment of the present invention, at least one of the third electrode part and the fourth electrode part may include a plurality of electrodes disposed in stripe patterns.

According to an exemplary embodiment of the present invention, a display system includes a display apparatus and polarizing glasses. The display apparatus includes a first substrate, a first liquid crystal layer, a second substrate, a second liquid crystal layer, a third substrate, a first polarizing element, a second polarizing element, and a phase retarding element. The first substrate includes a first electrode part. The first liquid crystal layer is disposed on the first substrate. The second substrate is disposed on the first liquid crystal layer. The second substrate includes a color filter and a second electrode part disposed on a first surface of the second substrate facing the first substrate. The second substrate also includes a third electrode part disposed on a second surface of the second substrate opposite to the first surface of the second substrate. The second liquid crystal layer is disposed on the second substrate. The third substrate is disposed on the second liquid crystal layer. The third substrate includes a fourth electrode part disposed on a first surface of the third substrate facing the second substrate. The first polarizing element is disposed under the first liquid crystal layer, with respect to a frame of reference in which the first substrate is considered to be under the third substrate. The second polarizing element is disposed over the first liquid crystal layer. The phase retarding element is disposed over the second liquid crystal layer. The polarizing glasses receive an image passing through the phase retarding element of the display apparatus. The polarizing glasses have left and right eye element including first and second polarizing filters. The first and second polarizing filters have different polarizing characteristics.

According to an exemplary embodiment of the present invention, the first and second polarizing filters of the polarizing glasses may be circular polarizing filters.

According to an exemplary embodiment of the preset invention, a method of manufacturing a display apparatus includes forming a first substrate including a first electrode part. A second substrate is formed on the first substrate. A third substrate is formed on the second substrate. The third substrate including a fourth electrode part is disposed on a first surface of the third substrate facing the second substrate. Liquid crystal molecules are injected between the first and second substrate to form a first liquid crystal layer. Liquid crystal molecules are injected between the second and third substrates to form a second liquid crystal layer. A first polarizing element is formed under the first liquid crystal layer, with respect to a frame of reference in which the first substrate is considered to be under the third substrate. A second polarizing element is formed over the first liquid crystal layer and a phase retarding element is formed over the second liquid crystal layer. The second substrate includes a color filter and a second electrode part disposed on a first surface of the second substrate facing the first substrate. The second substrate also includes a third electrode part disposed on a second surface of the second substrate opposite to the first surface of the second substrate.

According to an exemplary embodiment of the present invention, the first substrate may be disposed facing the second substrate and the first liquid crystal layer may be formed between the first and second substrates after forming the second liquid crystal layer between the second and third substrates.

According to an exemplary embodiment of the present invention, the third substrate may be disposed facing the second substrate and the second liquid crystal layer may be formed between the second and third substrates after forming the first liquid crystal layer between the first and second substrates.

According to an exemplary embodiment of the present invention, the first polarizing element may be formed under the first substrate. The second polarizing element may be formed between the second substrate and the second liquid crystal layer.

According to an exemplary embodiment of the present invention, the first polarizing element may be formed between the first substrate and the first liquid crystal layer. The second polarizing element may be formed between the first liquid crystal layer and the second substrate.

According to an exemplary embodiment of the present invention, the phase retarding element may be a quarter-wave plate which creates a quarter wavelength phase shift in the light transmitted therethrough.

According to an exemplary embodiment of the present invention, the phase retarding element may be formed on a second surface of the third substrate opposite to the first surface of the third substrate.

According to an exemplary embodiment of the present invention, the phase retarding element may be integrally formed with the third substrate and the combined phase retarding element and third substrate may be a rigid body. The phase retarding element may be patterned on a second surface of the third substrate opposite to the first surface of the third substrate.

According to an exemplary embodiment of the present invention, a display apparatus includes a first substrate including a first electrode part. A first liquid crystal layer is disposed on the first substrate. A second substrate is disposed on the first liquid crystal layer, and includes a color filter and a second electrode part disposed on a first surface of the second substrate facing the first substrate, and a third electrode part disposed on a second surface of the second substrate opposite to the first surface of the second substrate. A second liquid crystal layer is disposed on the second substrate. A third substrate is disposed on the second liquid crystal layer, and includes a fourth electrode part disposed on a first surface of the third substrate facing the second substrate. A first polarizing element is disposed either between the first liquid crystal layer and the first substrate or disposed on an opposite side of the first substrate from the side of the first substrate that the first liquid crystal layer is disposes on. A second polarizing element is disposed either between the first liquid crystal layer and the second substrate, between the second liquid crystal layer and the second substrate, between the second liquid crystal layer and the third substrate, or on the third substrate on an opposite side of the third substrate from the side of the third substrate that the second liquid crystal layer is disposed on. A phase retarding element is disposed either between the third substrate and the second liquid crystal layer, or on the third substrate on an opposite side of the third substrate from the side of the third substrate that the second liquid crystal layer is disposed on.

According to an exemplary embodiment of the present invention, the display apparatus includes three substrates and a manufacturing cost, a weight and a width of the display apparatus may be relatively low while a display quality may be relatively high.

BRIEF DESCRIPTION OF THE DRAWINGS

The above and other features of exemplary embodiments of the present invention will become more apparent by describing in detailed with reference to the accompanying drawings, in which.

DETAILED DESCRIPTION

Hereinafter, exemplary embodiments of the present invention will be explained in detail with reference to the accompanying drawings.

Figure 1:
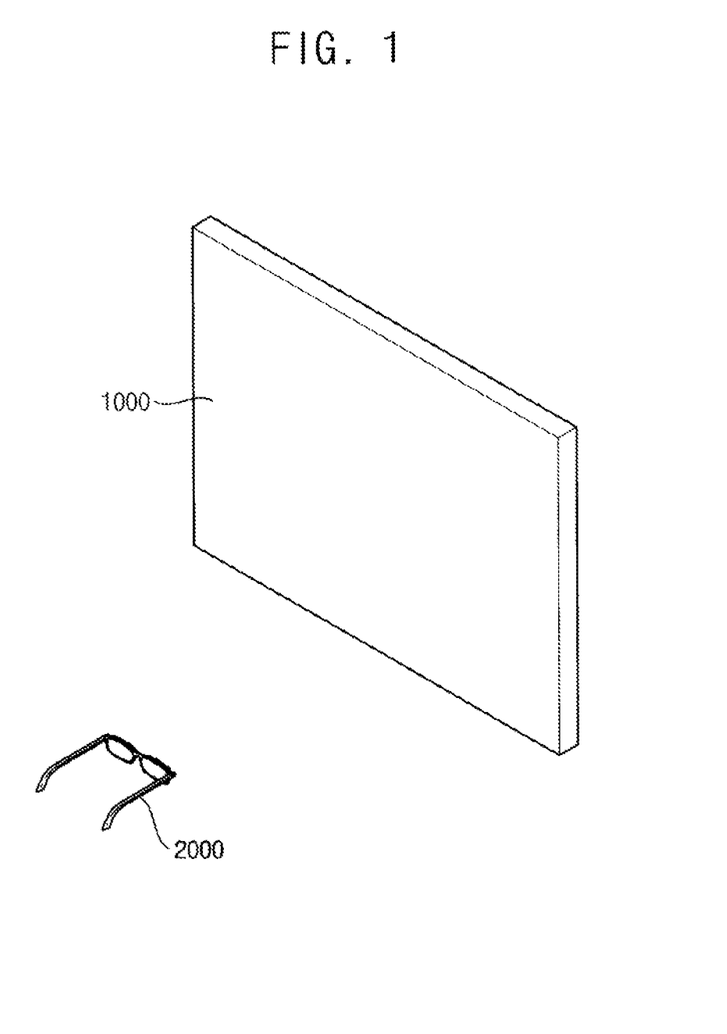
FIG. 1 is a perspective view illustrating a display system according to an exemplary embodiment of the present invention.
Figure 2:
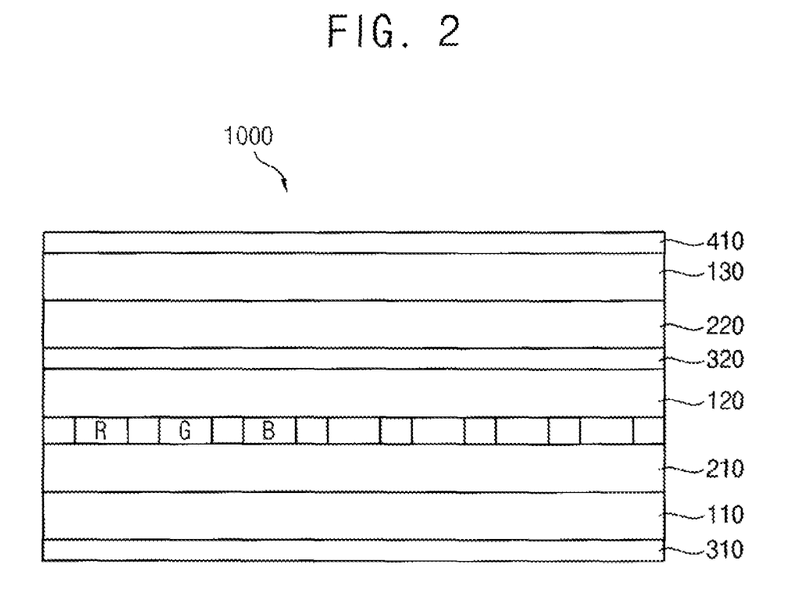
FIG. 2 is a cross-sectional view illustrating a display apparatus of FIG. 1.

FIG. 1 is a perspective view illustrating a display system according to an exemplary embodiment of the present invention. FIG. 2 is a cross-sectional view illustrating a display apparatus of FIG. 1.

Referring to FIGS. 1 and 2, the display system includes a display apparatus 1000 and polarizing glasses 2000.

The display apparatus 1000 displays an image. The display apparatus 1000 displays a two-dimensional ("2D") image or a three-dimensional ("3D") image. The display apparatus 1000 may display the 2D image or the 3D image according to settings of a user or specifications of content being displayed.

The display apparatus 1000 includes a first substrate 110, a second substrate 120, a third substrate 130, a first liquid crystal layer 210, a second liquid crystal layer 220, a first polarizing element 310, a second polarizing element 320 and a phase retarding element 410.

Although not shown in figures, the display apparatus 1000 may further include a backlight assembly disposed under or to a side of the first substrate 110 to provide light to the first substrate 110.

The backlight assembly includes a light source generating light. For example, the backlight assembly may include at least one of a cold cathode fluorescent lamp ("CCFL"), an external electrode fluorescent lamp ("EEFL"), a flat fluorescent lamp ("FFL"), and a light emitting diode ("LED").

The first substrate 110 includes a first electrode part. The first electrode part includes a plurality of pixel electrodes. The pixel electrodes may be disposed in a matrix form. The first electrode part may be disposed on an upper surface of the first substrate 110.

The first substrate 110 may include glass. The first electrode part may include a transparent conductive material. For example, the first electrode part may include one of indium tin oxide ("ITO") and indium zinc oxide ("IZO") or a mixture thereof.

The first substrate 110 may further include a plurality of gate lines extending in a first direction, a plurality of data lines extending in a second direction crossing the first direction and a plurality of switching elements connected to the gate lines and the data lines.

The second substrate 120 is disposed on the first substrate 110, although there may be additional elements situated between the second substrate 120 and the first substrate. The second substrate 120 faces the first substrate 110.

The second substrate 120 includes a second electrode part. The second electrode part includes a single common electrode. The common electrode may be disposed over substantially the entire area of the second substrate 120. The second electrode part may be disposed on a lower surface of the second substrate 120.

The second substrate 120 may include glass. The second electrode part may include a transparent conductive material. For example, the second electrode part may include one of ITO and IZO or a mixture thereof.

The second substrate further includes a plurality of color filters R, G, and B and a light blocking pattern disposed between the color filters R, G, and B. The color filters R, G, and B and the light blocking pattern may be disposed on the lower surface of the second substrate 120.

The first liquid crystal layer 210 is disposed between the first substrate 110 and the second substrate 120. The first liquid crystal layer 210 includes a plurality of liquid crystal molecules. A light transmittance of the first liquid crystal layer 210 is adjusted by an electric field between the pixel electrode of the first substrate 110 and the common electrode of the second substrate 120.

A liquid crystal display panel is defined by the first substrate 110, a lower portion of the second substrate 120 and the first liquid crystal layer 210.

The second substrate 120 further includes a third electrode part. The third electrode part may be disposed on an upper surface of the second substrate 120. The third electrode part may include a plurality of electrodes disposed in stripe patterns. The stripe patterns may include rows or columns of electrodes with space separating each of the rows or columns. Alternatively, the third electrode part may include a single electrode disposed over substantially the entire area of the second substrate 120.

The third electrode part may include a transparent conductive material. For example, the third electrode part may include one of ITO and IZO or a mixture thereof.

The third substrate 130 is disposed on the second substrate 120. The third substrate 130 faces the second substrate 120.

The third substrate 130 includes a fourth electrode part. The fourth electrode part may include a plurality of electrodes disposed in stripe patterns. Alternatively, the fourth electrode part may include a single electrode disposed over substantially the entire area of the third substrate 130. The fourth electrode part may be disposed on a lower surface of the third substrate 130.

For example, when the third electrode part includes a plurality of electrodes in stripe patterns, the fourth electrode part may include a single electrode. Alternatively, when the third electrode part includes a single electrode, the fourth electrode part may include a plurality of electrodes in stripe patterns. Alternatively, both of the third and fourth electrode parts respectively include electrodes in stripe patterns.

The third substrate 130 may include glass. Alternatively, or additionally, the third substrate 130 may include plastic. The fourth electrode part may include a transparent conductive material. For example, the fourth electrode part may include one of ITO and IZO or a mixture thereof.

The second liquid crystal layer 220 is disposed between the second substrate 120 and the third substrate 130. The second liquid crystal layer 220 includes a plurality of liquid crystal molecules. A light transmittance of the second liquid crystal layer 220 is adjusted by an electric field between the third electrode part of the second substrate 120 and the fourth electrode part of the third substrate 130.

An active switch panel is defined by an upper portion of the second substrate, the third substrate 130 and the second liquid crystal layer 220. The active switch panel alters polarizing characteristics of an image displayed on the display panel to generate a left image and a right image.

The display panel and the active switch panel are driven by temporal division. The active switch panel is driven in synchronous with the image displayed on the display panel.

For example, during a first sub frame, the display panel displays a first image and the active switch panel has a first polarizing state. The image passing through the active switch panel is transmitted to a left eye of the viewer via the polarizing glasses 2000. During a second sub frame, the display panel displays a second image and the active switch panel has a second polarizing state. The image passing through the active switch panel is transmitted to a right eye of the viewer via the polarizing glasses 2000. The viewer may watch the 3D image using the display system.

The first polarizing element 310 is disposed under the first substrate 110. For example, the first polarizing element 310 may adhere to the lower surface of the first substrate 110. The first polarizing element 310 may be a polarizing film formed independently from the first substrate 110. Iodine is absorbed on a polyvinyl alcohol film, and the polyvinyl alcohol film is extended in a particular direction to form the first polarizing element 310.

The first polarizing element 310 polarizes light provided from the backlight assembly. The first polarizing element 310 has a first polarizing axis. The first polarizing element 310 passes light having a direction of polarization of the first polarizing axis among the light having various directions of polarization provided from the backlight assembly.

The second polarizing element 320 is disposed between the second substrate 120 and the second liquid crystal layer 220. For example, the second polarizing element 320 may adhere to the upper surface of the second substrate 120. The second polarizing element 320 may be a polarizing film formed independently from the second substrate 120. Iodine is absorbed on a polyvinyl alcohol film, and the polyvinyl alcohol film is extended in a particular direction to form the second polarizing element 320.

The second polarizing element 320 polarizes light passing through the first liquid crystal layer 210. The second polarizing element 320 has a second polarizing axis. The second polarizing axis may be substantially perpendicular to the first polarizing axis. The second polarizing element 320 passes light having a direction of polarization of the second polarizing axis among the light having various directions of polarization passing through the first liquid crystal layer 210.

The phase retarding element 410 is disposed on the third substrate 130. For example, the phase retarding element 410 may adhere to an upper surface of the third substrate 130. The phase retarding element 410 may be a phase retarding film formed independently from the third substrate 130. In an exemplary embodiment, the phase retarding element 410 may be disposed between the third substrate 130 and the second liquid crystal layer 220.

The phase retarding element 410 converts a linear polarization characteristic of the light passing through the second liquid crystal layer 220 into a circular polarization characteristic. For example, the phase retarding element 410 may be a quarter-wave plate which creates a quarter wavelength phase shift in the light transmitted therethrough.

The display apparatus 1000 may further include a gate driver and a data driver. The gate driver and the data driver are connected to the first substrate 110 to output driving signals to the first substrate 110. The gate and data drivers may respectively include a flexible printed circuit ("FPC"), a driving chip mounted on the FPC and a printed circuit board ("PCB") connected to the FPC.

The display apparatus 1000 may further include an active switch driver. The active switch driver is connected to the second substrate 120 and the third substrate 130 to output driving signals to the third electrode part and the fourth electrode part.

The polarizing glasses 2000 receive the image transmitted from the display apparatus 1000. The polarizing glasses 2000 receive the image passing through the phase retarding element 410 of the display apparatus 1000.

When the display apparatus 1000 displays a 3D image, the polarizing glasses 2000 transmit a left image of the 3D image to a left eye of a viewer and transmit a right image of the 3D image to a right eye of the viewer.

The polarizing glasses 2000 have different polarizing characteristics according to left and right eyes. For example, the polarizing glasses 2000 may be circular polarizing glasses.

Figure 3A:
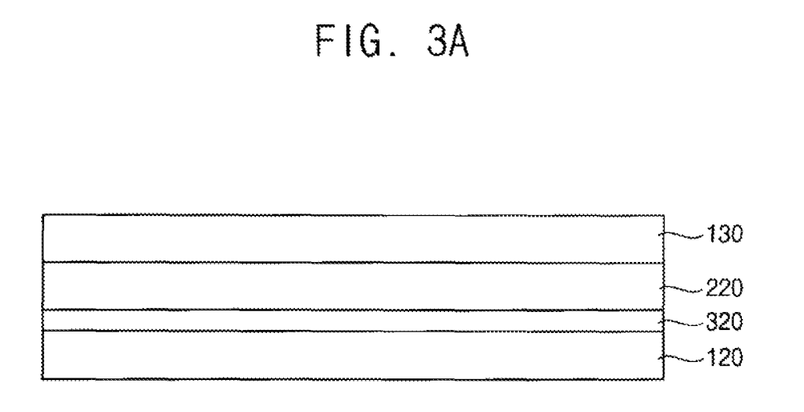
FIGS. 3A to 3C are cross-sectional views illustrating processes of manufacturing the display apparatus of FIG. 1.
Figure 3B:
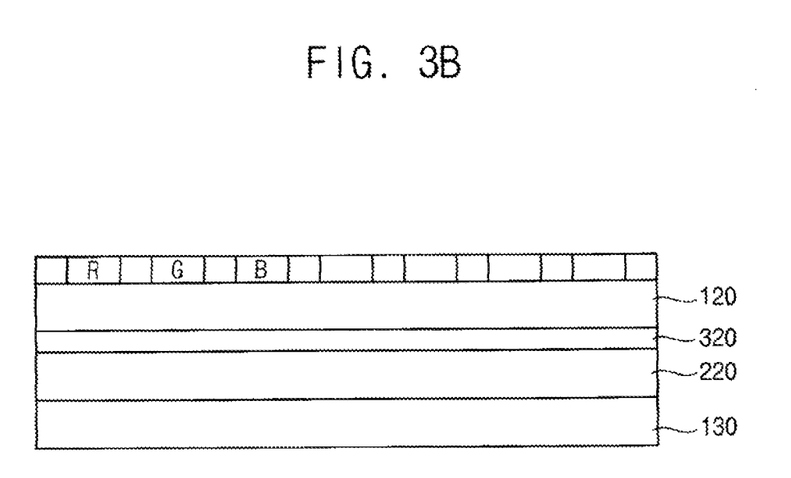
Figure 3C:
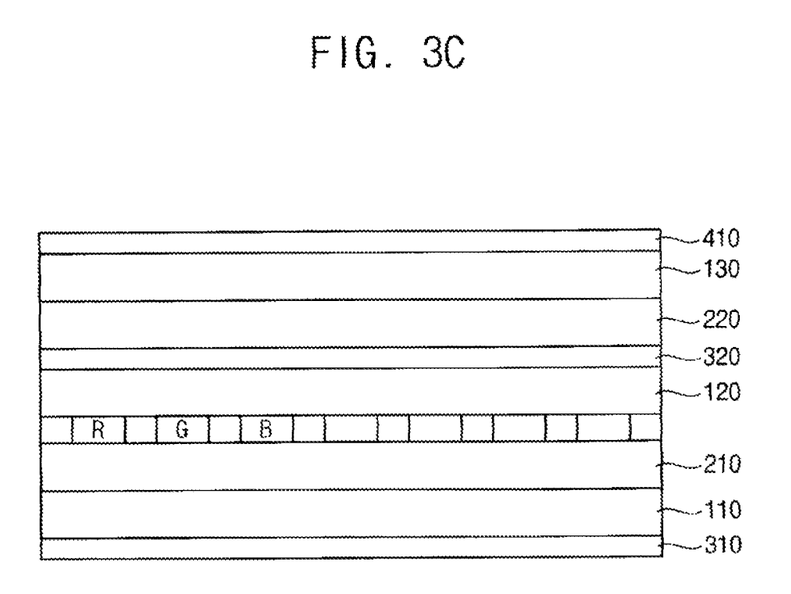

FIGS. 3A to 3C are cross-sectional views illustrating processes of manufacturing the display apparatus 1000 of FIG. 1.

Referring to FIG. 3A, the second substrate 120 including the third electrode part is formed. A surface of the second substrate 120 on which the third electrode part is formed is defined as an upper surface. The second polarizing element 320 is formed on the upper surface of the second substrate 120 on which the third electrode part is formed.

The third substrate 130 including the fourth electrode part is formed. A surface of the third substrate 130 on which the fourth electrode part is formed is defined as a lower surface. The second substrate 120 and the third substrate 130 face each other.

The second liquid crystal layer 220 is injected between the second polarizing element 320 and the third substrate 130. The second substrate 120 and the third substrate 130 are sealed.

Referring to FIG. 3B, the second substrate 120, the second polarizing element 320, the second liquid crystal layer 220, and the third substrate 130 are turned upside down.

The second electrode part and the color filters R, G, and B are formed on a surface of the second substrate 120 opposite to the surface on which the third electrode part is formed.

Referring to FIG. 3C, the third substrate 130, the second liquid crystal layer 220, the second polarizing element 320 and the second substrate 120 including the second electrode part and the color filters R, G, and B are turned upside down.

The first substrate 110 including the first electrode part is formed. A surface of the first substrate 110 on which the first electrode part is formed is defined as an upper surface. The first substrate 110 is disposed facing the surface of the second substrate 120 on which the second electrode part and the color filters R, G, and B are formed.

The first liquid crystal layer 210 is injected between the first substrate 110 and the second substrate 120. The first substrate 110 and the second substrate 120 are sealed.

The first polarizing element 310 is formed on a surface of the first substrate 110 opposite to the surface on which the first electrode part is formed. The phase retarding element 410 is formed on a surface of the third substrate 130 opposite to the surface on which the fourth electrode part is formed. In an exemplary embodiment, the phase retarding element 410 may be disposed between the third substrate 130 and the second liquid crystal layer 220.

According to exemplary embodiments of the present invention, the display apparatus 1000 includes three substrates 110, 120 and 130 and a manufacturing cost, a weight, and a thickness of the display apparatus 1000 may be relatively low.

The display panel and the active switch panel of the display apparatus 1000 are integrally formed so that a bonding process of the display panel and the active switch panel may be omitted. Thus, a manufacturing cost of the display apparatus 1000 may be relatively low. A stain generated in the bonding process may be prevented so that a display quality of the display apparatus 1000 may be made relatively high.

Figure 4A:
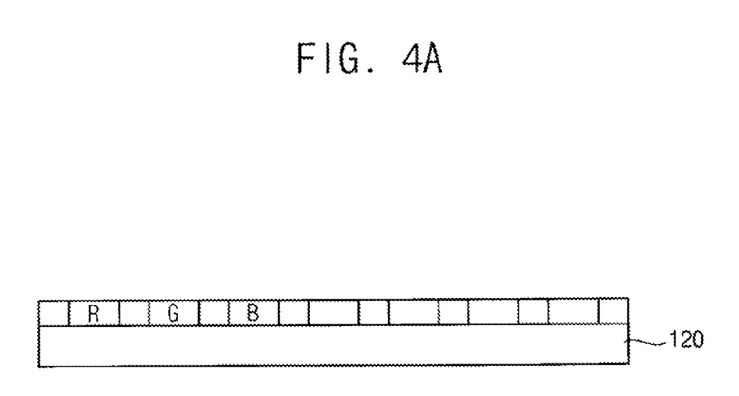
FIGS. 4A to 4C are cross-sectional views illustrating processes of manufacturing a display apparatus according to an exemplary embodiment of the present invention.
Figure 4B:
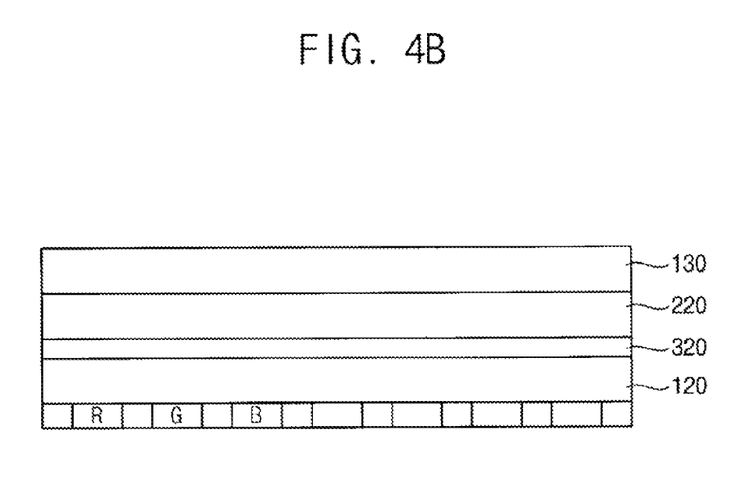
Figure 4C:
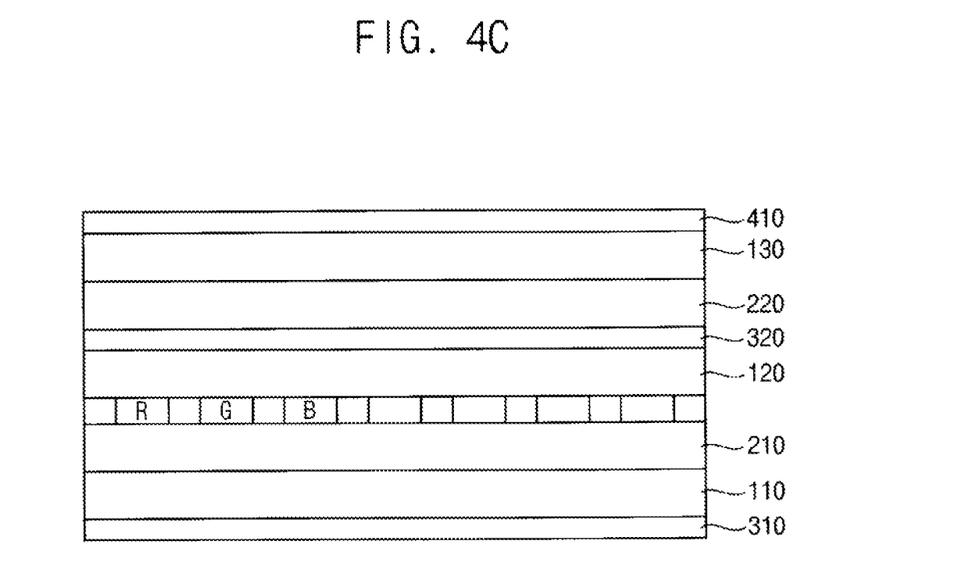

FIGS. 4A to 4C are cross-sectional views illustrating processes of manufacturing a display apparatus according to an exemplary embodiment of the present invention.

A display system and a display apparatus according to an exemplary embodiment of the present invention may be substantially the same as the display system and the display apparatus discussed above referring to FIGS. 1 to 3C.

A method of manufacturing a display apparatus according to an exemplary embodiment of the present invention may be substantially the same as the method of manufacturing the display apparatus discussed above referring to FIGS. 1 to 3C. Thus, the same reference numerals may be used to refer to the same or like parts as those described above with respect to FIGS. 1 to 3C and any repetitive explanation concerning the above elements may be omitted.

Referring to FIG. 4A, the second electrode part and the color filters R, G, and B are formed at a surface of the second substrate 120.

Referring to FIG. 4B, the second substrate 120 including the second electrode part and the color filters R, G, and B is turned upside down.

The third electrode part is formed on a surface of the second substrate 120 opposite to the surface on which the second electrode part and the color filters R, G, and B are formed. The surface of die second substrate 120 on which the third electrode part is formed is defined as an upper surface. The second polarizing element 320 is formed on the upper surface of the second substrate 120.

The third substrate 130 including the fourth electrode part is formed. A surface of the third substrate 130 on which the fourth electrode part is formed is defined as a lower surface. The second substrate 120 and the third substrate 130 face each other.

The second liquid crystal layer 220 is injected between the second polarizing element 320 and the third substrate 130. The second substrate 120 and the third substrate 130 are sealed.

Referring to FIG. 4C, the first substrate 110 including the first electrode part is formed. A surface of the first substrate 110 on which the first electrode part is formed is defined as an upper surface. The first substrate 110 is disposed facing the surface of the second substrate 120 on which the second electrode part and the color filters R, G, and B are formed.

The first liquid crystal layer 210 is injected between the first substrate 110 and the second substrate 120. The first substrate 110 and the second substrate 120 are sealed.

The first polarizing element 310 is formed on a surface of the first substrate 110 opposite to the surface on which the first electrode part is formed. The phase retarding element 410 is formed on a surface of the third substrate 130 opposite to the surface on which the fourth electrode part is formed. In an exemplary embodiment, the phase retarding element 410 may be disposed between the third substrate 130 and the second liquid crystal layer 220.

According to exemplary embodiments of the present invention, the display apparatus 1000 includes three substrates 110, 120 and 130 so that a manufacturing cost, a weight and a thickness of the display apparatus 1000 may be relatively low.

The display panel and the active switch panel of the display apparatus 1000 are integrally formed so that a bonding process of the display panel and the active switch panel may be omitted. Thus, a manufacturing cost of the display apparatus 1000 may be relatively low. A stain generated in the bonding process may be prevented so that a display quality of the display apparatus 1000 may be relatively high.

Figure 5A:
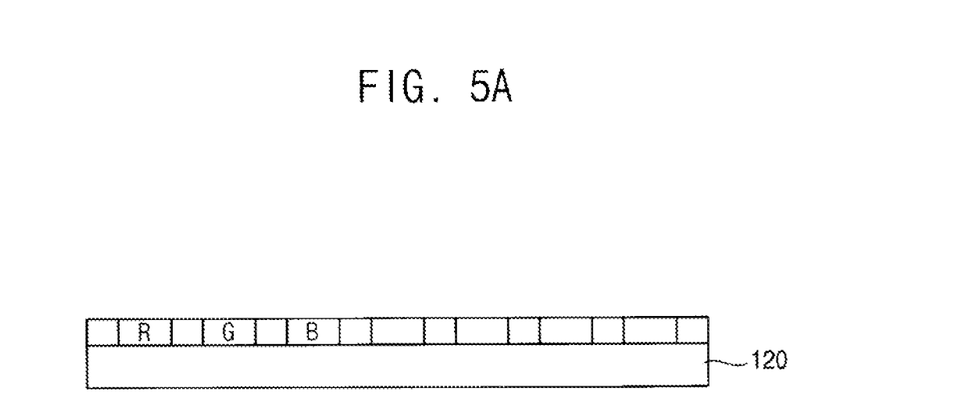
FIGS. 5A to 5C are cross-sectional views illustrating processes of manufacturing a display apparatus according to an exemplary embodiment of the present invention.
Figure 5B:
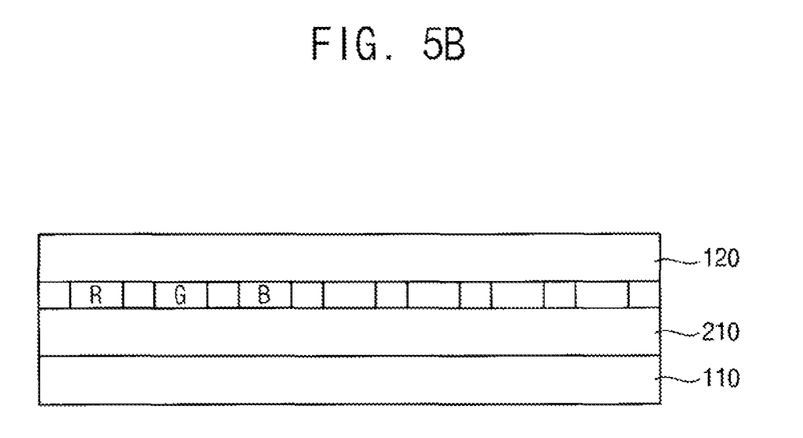
Figure 5C:
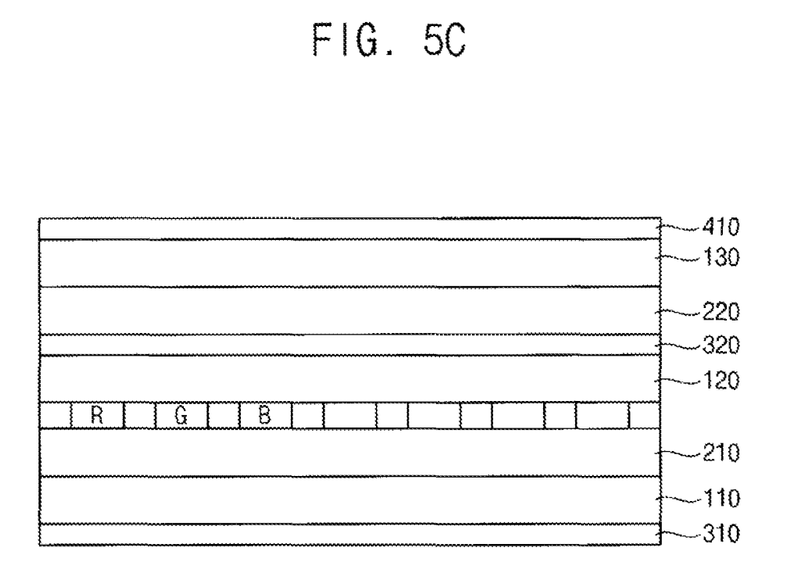

FIGS. 5A to 5C are cross-sectional views illustrating processes of manufacturing a display apparatus according to an exemplary embodiment of the present invention.

A display system and a display apparatus according to exemplary embodiments of the present invention may be substantially the same as the display system and the display apparatus discussed above referring to FIGS. 1 to 3C.

A method of manufacturing a display apparatus according to exemplary embodiments of the present invention may be substantially the same as the method of manufacturing the display apparatus discussed above referring to FIGS. 1 to 3C. Thus, the same reference numerals may be used to refer to the same or like parts as those described in the previous exemplary embodiment of FIGS. 1 to 3C and any repetitive explanation concerning the above elements may be omitted.

Referring to FIG. 5A, the second electrode part and the color filters R, G, and B are formed at a surface of the second substrate 120.

Referring to FIG. 5B, the second substrate 120 including the second electrode part and the color filters R, G, and B is turned upside down.

The first substrate 110 including the first electrode part is formed. A surface of the first substrate 110 on which the first electrode part is formed is defined as an upper surface. The first substrate 110 is disposed facing the surface of the second substrate 120 on which the second electrode part and the color filters R, G, and B are formed.

The first liquid crystal layer 210 is injected between the first substrate 110 and the second substrate 120. The first substrate 110 and the second substrate 120 are sealed.

The third electrode part is formed on a surface of the second substrate 120 opposite to the surface on which the second electrode part and the color filters R, G, and B are formed. The surface of the second substrate 120 on which the third electrode part is formed is defined as an upper surface. The second polarizing element 320 is disposed on the upper surface of the second substrate 120.

The third substrate 130 including the fourth electrode part is formed. A surface of the third substrate 130 on which the fourth electrode part is formed is defined as a lower surface. The second substrate 120 and the third substrate 130 face each other.

The second liquid crystal layer 220 is injected between the second polarizing element 320 and the third substrate 130. The second substrate 120 and the third substrate 130 are sealed.

The first polarizing element 310 is formed on a surface of the first substrate 110 opposite to the surface on which the first electrode part is formed. The phase retarding element 410 is formed on a surface of the third substrate 130 opposite to the surface on which the fourth electrode part is formed. In an exemplary embodiment, the phase retarding element 410 may be disposed between the third substrate 130 and the second liquid crystal layer 220.

According to exemplary embodiments of the present invention, the display apparatus 1000 includes three substrates 110, 120 and 130 accordingly; a manufacturing cost, a weight and a thickness of the display apparatus 1000 may be kept relatively low.

The display panel and the active switch panel of the display apparatus 1000 are integrally formed so that a bonding process of the display panel and the active switch panel may be omitted. Thus, a manufacturing cost of the display apparatus 1000 may be kept relatively low. A stain generated in the bonding process may be prevented so that a display quality of the display apparatus 1000 may be kept relatively high.

Figure 6:
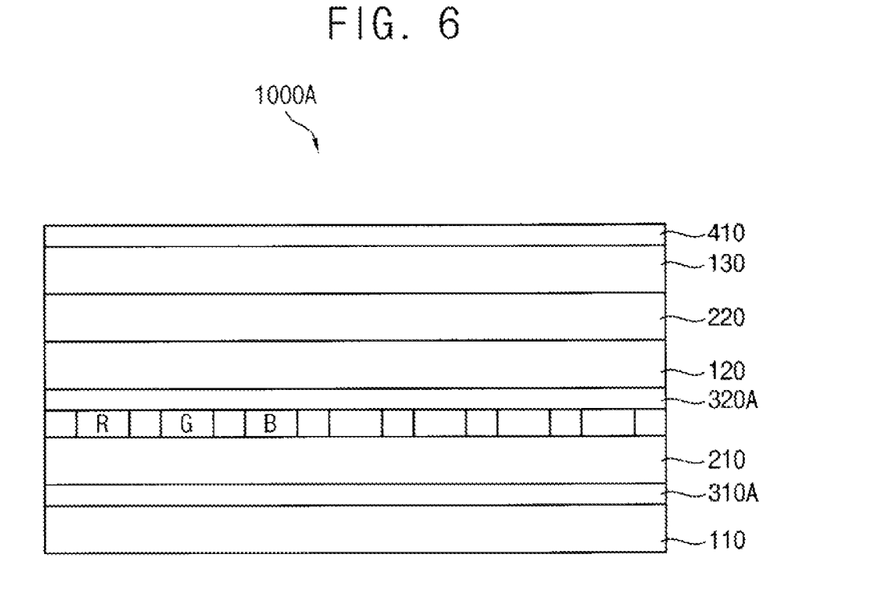
FIG. 6 is cross-sectional view illustrating a display apparatus according to an exemplary embodiment of the present invention.

FIG. 6 is cross-sectional view illustrating a display apparatus 1000A according to an exemplary embodiment of the present invention.

A display system, a display apparatus and a method of manufacturing the display apparatus according to exemplary embodiments of the present invention may be substantially the same as the display system, the display apparatus and the method of manufacturing the display apparatus discussed above referring to FIGS. 1 to 3C except for the first polarizing element and the second polarizing element. Thus, the same reference numerals may be used to refer to the same or like parts as those described above with reference to FIGS. 1 to 3C and any repetitive explanation concerning the above elements may be omitted.

Referring to FIGS. 1 and 6, the display system includes a display apparatus 1000A and polarizing glasses 2000.

The display apparatus 1000A includes a first substrate 110, a second substrate 120, a third substrate 130, a first liquid crystal layer 210, a second liquid crystal layer 220, a first polarizing element 310A, a second polarizing element 320A and a phase retarding element 410.

The first polarizing element 310A is disposed between the first substrate 110 and the first liquid crystal layer 210. For example, the first polarizing element 310A may be a wire grid polarizing plate including a plurality of metal patterns extending in a particular direction. The metal patterns may be disposed in a uniform interval.

The first polarizing element 310A polarizes light provided from the backlight assembly. The first polarizing element 310A has a first polarizing axis. The first polarizing element 310A passes light having a direction of polarization of the first polarizing axis among the light having various directions of polarization provided from the backlight assembly.

The second polarizing element 320A is disposed between the first liquid crystal layer 210 and the second substrate 120. For example, the second polarizing element 320A may be a wire grid polarizing plate including a plurality of metal patterns extending in a particular direction. The metal patterns may be disposed in a uniform interval.

The second polarizing element 320A polarizes light passing through the first liquid crystal layer 210. The second polarizing element 320 has a second polarizing axis. The second polarizing axis may be substantially perpendicular to the first polarizing axis. The second polarizing element 320 passes light having a direction of polarization of the second polarizing axis among the light having various directions of polarization passing through the first liquid crystal layer 210.

According to an exemplary embodiment of the present invention, the display apparatus 1000A includes three substrates 110, 120 and 130 so that a manufacturing cost, a weight and a thickness of the display apparatus 1000A may be kept relatively low.

The display panel and the active switch panel of the display apparatus 1000A are integrally formed so that a bonding process of the display panel and the active switch panel may be omitted. Thus, a manufacturing cost of the display apparatus 1000A may be kept relatively low. A stain generated in the bonding process may be prevented so that a display quality of the display apparatus 1000A may be kept relatively high.

Furthermore, the first and second polarizing elements 310A and 320A have an in-cell structure, so that the first and second polarizing elements 310A and 320A are not damaged even though liquid crystal molecules of the second liquid crystal layer 220 are aligned in a high temperature. Thus, a display quality of the display apparatus 1000A may be kept relatively high.

Figure 7:
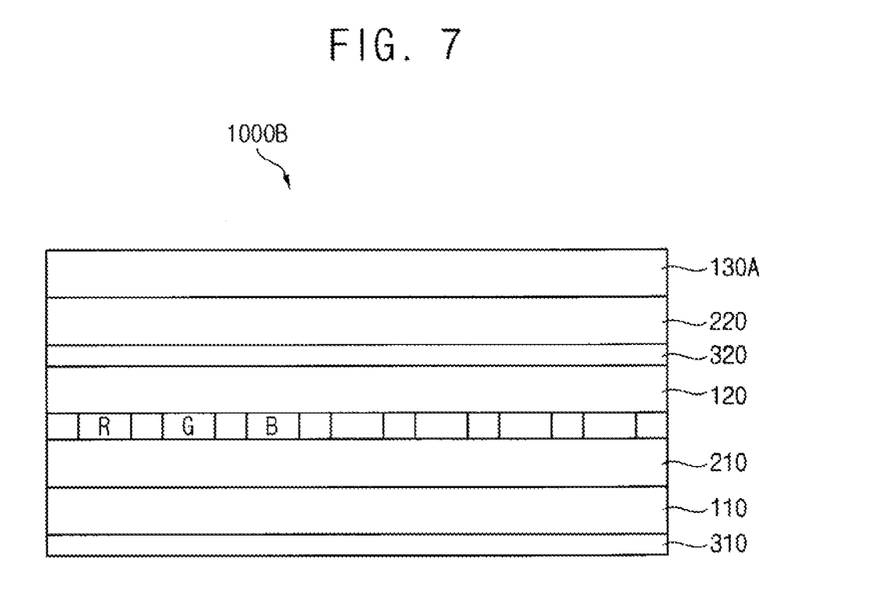
FIG. 7 is cross-sectional view illustrating a display apparatus according to an exemplary embodiment of the present invention.

FIG. 7 is cross-sectional view illustrating a display apparatus 1000B according to an exemplary embodiment of the present invention.

A display system, a display apparatus and a method of manufacturing the display apparatus according to exemplary embodiments of the present invention are substantially the same as the display system, the display apparatus and the method of manufacturing the display apparatus discussed above referring to FIGS. 1 to 3C except for the third substrate and the phase retarding element. Thus, the same reference numerals may be used to refer to the same or like parts as those described above with respect to FIGS. 1 to 3C and any repetitive explanation concerning the above elements may be omitted.

Referring to FIGS. 1 and 7, the display system includes a display apparatus 1000B and polarizing glasses 2000.

The display apparatus 1000B includes a first substrate 110, a second substrate 120, a third substrate 130A, a first liquid crystal layer 210, a second liquid crystal layer 220, a first polarizing element 310 and a second polarizing element 320.

The third substrate 130A includes a fourth electrode part. The fourth electrode part may include a plurality of electrodes disposed in stripe patterns. Alternatively, the fourth electrode part may include a single electrode disposed over substantially the entire area of the third substrate 130A. The fourth electrode part may be disposed on a lower surface of the third substrate 130A.

The third substrate 130A may include glass. Alternatively, the third substrate 130A may include plastic. The fourth electrode part may include a transparent conductive material. For example, the fourth electrode part may include one of ITO and IZO or a mixture thereof.

The third substrate 130A may further include a phase retarding pattern. The phase retarding pattern may be formed on an upper surface of the third substrate 130A.

The phase retarding pattern converts a linear polarization characteristic of the light passing through the second liquid crystal layer 220 into a circular polarization characteristic. For example, the phase retarding pattern may be a quarter-wave phase shift pattern. For example, the phase retarding pattern may delay the phase of light transmitted therethough by one quarter of one wavelength of the light being transmitted.

According to exemplary embodiments of the present invention, the display apparatus 1000B includes three substrates 110, 120 and 130A and a manufacturing cost, a weight and a thickness of the display apparatus 1000B may be kept relatively low.

The third substrate 130A and the phase retarding element of the display apparatus 1000B are integrally formed and the combined structure may be a rigid body so that a process attaching the phase retarding element to the third substrate 130A may be omitted. Thus, a manufacturing process of the display apparatus 1000B may be made relatively simple.

Figure 8:
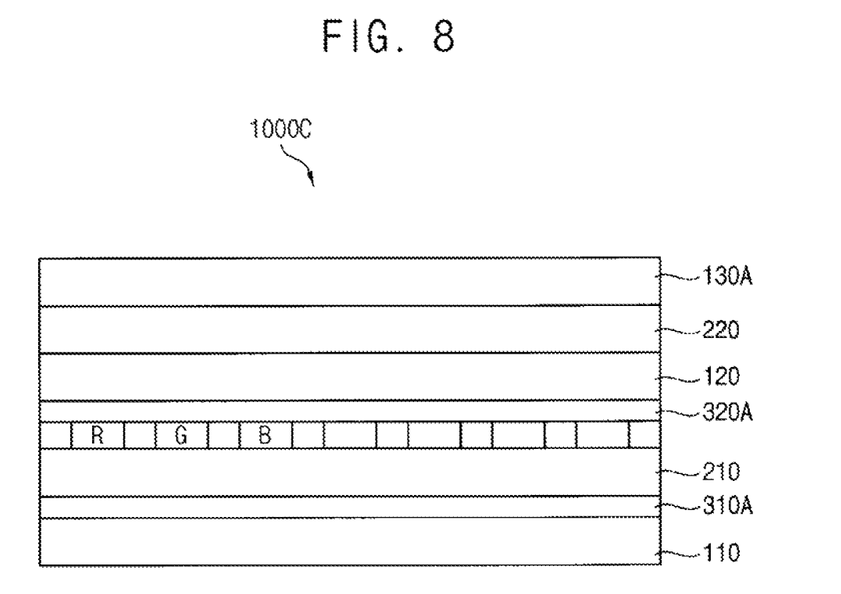
FIG. 8 is cross-sectional view illustrating a display apparatus according to an exemplary embodiment of the present invention.

FIG. 8 is cross-sectional view illustrating a display apparatus 1000C according to an exemplary embodiment of the present invention.

A display system, a display apparatus and a method of manufacturing the display apparatus according to an exemplary embodiment of the present invention are substantially the same as the display system, the display apparatus and the method of manufacturing the display apparatus discussed above referring to FIG. 6 except for the third substrate and the phase retarding element. Thus, the same reference numerals may be used to refer to the same or like parts as those described in the previous exemplary embodiment of FIG. 6 and any repetitive explanation concerning the above elements will be omitted.

Referring to FIGS. 1 and 8, the display system includes a display apparatus 1000C and polarizing glasses 2000.

The display apparatus 1000C includes a first substrate 110, a second substrate 120, a third substrate 130A, a first liquid crystal layer 210, a second liquid crystal layer 220, a first polarizing element 310A and a second polarizing element 320A.

The first polarizing element 310A is disposed between the first substrate 110 and the first liquid crystal layer 210. For example, the first polarizing element 310A may be a wire grid polarizing plate including a plurality of metal patterns extending in a particular direction. The metal patterns may be disposed in a uniform interval.

The second polarizing element 320A is disposed between the first liquid crystal layer 210 and the second substrate 120. For example, the second polarizing element 320A may be a wire grid polarizing plate including a plurality of metal patterns extending in a particular direction. The metal patterns may be disposed in a uniform interval.

The third substrate 130A includes a fourth electrode part. The fourth electrode part may include a plurality of electrodes disposed in stripe patterns. Alternatively, the fourth electrode part may include a single electrode disposed over substantially the entire area of the third substrate 130A. The fourth electrode part may be disposed on a lower surface of the third substrate 130A.

The third substrate 130A may include glass. Alternatively, the third substrate 130A may include plastic. The fourth electrode part may include a transparent conductive material. For example, the fourth electrode part may include one of ITO and IZO or a mixture thereof.

The third substrate 130A may former include a phase retarding pattern. The phase retarding pattern may be formed on an upper surface of the third substrate 130A.

The phase retarding pattern converts a linear polarization characteristic of the light passing through the second liquid crystal layer 220 into a circular polarization characteristic. For example, the phase retarding pattern may be a quarter-wave phase shift pattern. For example, the phase retarding pattern may delay the phase of light transmitted therethrough by one quarter of one wavelength of the light being transmitted.

According to exemplary embodiments of the present invention, the display apparatus 1000C includes three substrates 110, 120 and 130A so that a manufacturing cost, a weight and a thickness of the display apparatus 1000C may be kept relatively low.

The first and second polarizing elements 310A and 320A have an in-cell structure, so that the first and second polarizing elements 310A and 320A are not damaged by liquid crystal molecules of the second liquid crystal layer 220 being aligned in a high temperature. Thus, a display quality of the display apparatus 1000C may be kept relatively high.

Furthermore, the third substrate 130A and the phase retarding element of the display apparatus 1000C are integrally formed and the combined structure may be a rigid body so that a process attaching the phase retarding element to the third substrate 130A may be omitted. Thus, a manufacturing process of the display apparatus 1000C may be kept relatively simple.

According to exemplary embodiments of the present invention, the display apparatus includes three substrates 110, 120 and 130A so that a manufacturing cost, a weight and a thickness of the display apparatus may be kept relatively low.

The foregoing is illustrative of exemplary embodiments of the present invention and is not to be construed as limiting. Those skilled in the art will readily appreciate that many modifications are possible in the exemplary embodiments without materially departing from the present disclosure.

What is claimed is:
1. A display apparatus comprising:
a first substrate including a first electrode part;
a first liquid crystal layer disposed on the first substrate;
a second substrate disposed on the first liquid crystal layer, and including a color filter and a second electrode part disposed on a first surface of the second substrate facing the first substrate, and a third electrode part disposed on a second surface of the second substrate opposite to the first surface of the second substrate, wherein the first electrode part, the first liquid crystal layer, and the second electrode part form a first liquid crystal panel;
a second liquid crystal layer disposed on the second substrate;
a third substrate disposed on the second liquid crystal layer, and including a fourth electrode part disposed on a first surface, of the third substrate facing the second substrate, wherein the third electrode part, the second liquid crystal layer, and the fourth electrode part form a second liquid crystal panel that is different from the first liquid crystal panel;
a first polarizing element of the first liquid crystal panel disposed under the first liquid crystal layer, with respect to a frame of reference in which the first substrate is considered to be under the third substrate;
a second polarizing element of the first liquid crystal panel disposed over the first liquid crystal layer; and
a phase retarding element disposed over the second liquid crystal layer,
wherein the first polarizing element of the first liquid crystal panel is disposed under the first substrate of the first liquid crystal panel, and the second polarizing element of the first liquid crystal panel is disposed between the third electrode part of the second liquid crystal panel and the second liquid crystal layer of the second liquid crystal panel, and wherein the phase retarding element is integrally formed with the third substrate as a rigid body and the phase retarding element is patterned on a second surface of the third substrate opposite to the first surface of the third substrate.

2. The display apparatus of claim 1, wherein each of the first substrate, the second substrate and the third substrate includes glass.

3. The display apparatus of claim 1, wherein each of the first substrate and the second substrate includes glass, and the third substrate includes plastic.

4. The display apparatus of claim 1, wherein the first electrode part includes a plurality of pixel electrodes disposed in a matrix form, and the second electrode part includes a common electrode.

5. The display apparatus of claim 4, wherein at least one of the third electrode part and the fourth electrode part includes a plurality of electrodes disposed in stripe patterns.

6. A display system comprising:
a display apparatus comprising:
a first substrate including a first electrode part;
a first liquid crystal layer disposed on the first substrate;
a second substrate disposed on the first liquid crystal layer, and including a color filter and a second electrode part disposed on a first surface of the second substrate facing the first substrate, and a third electrode part disposed on a second surface of the second substrate opposite to the first surface of the second substrate, wherein the first electrode part, the first liquid crystal layer, and the second electrode part form a first liquid crystal panel;
a second liquid crystal layer disposed on the second substrate;
a third substrate disposed on the second liquid crystal layer, and including a fourth electrode part disposed on a first surface of the third substrate facing the second substrate, wherein the third electrode part, the second liquid crystal layer, and the fourth electrode part form a second liquid crystal panel that is different from the first liquid crystal panel;
a first polarizing element of the first liquid crystal panel disposed under the first liquid crystal layer, with respect to a frame of reference in which the first substrate is considered to be under the third substrate;
a second polarizing element of the first liquid crystal panel disposed over the first liquid crystal layer;
a phase retarding element disposed over the second liquid crystal layer; and
polarizing glasses receiving an image passing through the phase retarding element of the display apparatus, the polarizing glasses having a left-eye element including a first polarizing filter and a right-eye element including a second polarizing filter, the second polarizing filter having different polarization than the first polarizing filter, wherein the first polarizing element of the first liquid crystal panel is disposed under the first substrate of the first liquid crystal panel, and the second polarizing element of the first liquid crystal panel is disposed between the third electrode part of the second liquid crystal panel and the second liquid crystal layer of the second liquid crystal panel, and wherein the phase retarding element is integrally formed with the third substrate as a rigid body and the phase retarding element is patterned on a second surface of the third substrate opposite to the first surface of the third substrate.

7. The display system of claim 6, wherein the first and second polarizing filters are circular polarizing filters.

8. A display apparatus comprising:
a first substrate including a first, electrode part;
a first liquid crystal layer disposed on the first substrate;
a second substrate disposed on the first liquid crystal layer, and including a color filter and a second electrode part disposed on a first surface of the second substrate facing the first substrate, and a third electrode part disposed on a second surface of the second substrate opposite to the first surface of the second substrate, wherein the first electrode part, the first liquid crystal layer, and the second electrode part form a first liquid crystal panel;
a second liquid crystal layer disposed on the second substrate;
a third substrate disposed on the second liquid crystal layer, and including a fourth electrode part disposed on a first surface of the third substrate facing the second substrate, wherein the third electrode part, the second liquid crystal layer, and the fourth electrode part form a second liquid crystal panel that is different from the first liquid crystal panel;
a first polarizing element of the first liquid crystal panel disposed on an opposite side of the first substrate from the side of the first substrate that the first liquid crystal layer is disposes on;
a second polarizing element of the first liquid crystal panel disposed between the second liquid crystal layer and the second substrate; and
a phase retarding element disposed either between the third substrate and the second liquid crystal layer, or on the third substrate on an opposite side of the third substrate from the side of the third substrate that the second liquid crystal layer is disposed on, wherein the second polarizing element of the first liquid crystal panel is disposed between the third electrode part of the second liquid crystal panel and the second liquid crystal layer of the second liquid crystal panel, and wherein the phase retarding element is integrally formed with the third substrate as a rigid body and the phase retarding element is patterned on a second surface of the third substrate opposite to the first surface of the third substrate.

* * * * *